(12) United States Patent
Burris et al.

(10) Patent No.: US 6,752,212 B2
(45) Date of Patent: Jun. 22, 2004

(54) DUMP VALVE ASSEMBLY FOR SELECTIVE DRAINING OF LIQUID FROM AN OIL WELL PIPE STREAM

(75) Inventors: Mark A. Burris, Iola, KS (US); Donald R. Hibler, Jr., Bates City, MO (US)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 10/443,522

(22) Filed: May 22, 2003

(65) Prior Publication Data

US 2003/0192701 A1 Oct. 16, 2003

Related U.S. Application Data

(63) Continuation of application No. 09/863,993, filed on May 23, 2001, now Pat. No. 6,591,915, and a continuation of application No. 09/078,891, filed on May 14, 1998, now abandoned.

(51) Int. Cl.$^7$ .............................................. E21B 29/00
(52) U.S. Cl. ...................................... 166/317; 166/105
(58) Field of Search ............................... 166/376, 317, 166/386, 105; 137/68.23, 68.25, 68.26, 68.28

(56) References Cited

U.S. PATENT DOCUMENTS

| | | | | |
|---|---|---|---|---|
| 1,854,477 A | * | 4/1932 | McKissick | 137/68.11 |
| 2,178,845 A | * | 11/1939 | Baker | 166/223 |
| 2,201,290 A | * | 5/1940 | Greene | 175/4.55 |
| 2,589,144 A | * | 3/1952 | Russell et al. | 137/70 |
| 3,358,770 A | * | 12/1967 | Zandmer | 166/317 |
| 3,366,182 A | * | 1/1968 | Solum | 166/208 |
| 3,404,698 A | * | 10/1968 | Rouse | 137/68.23 |
| 3,417,822 A | * | 12/1968 | Howell | 166/301 |
| 3,762,219 A | * | 10/1973 | Jessup | 73/152.23 |
| 3,981,360 A | * | 9/1976 | Marathe | 166/317 |
| 4,126,184 A | * | 11/1978 | Hinrichs | 169/56 |
| 4,286,662 A | * | 9/1981 | Page, Jr. | 166/317 |
| 4,549,565 A | * | 10/1985 | Short, III | 137/71 |
| 4,609,005 A | * | 9/1986 | Upchurch | 137/68.22 |
| 4,909,326 A | * | 3/1990 | Owen | 166/317 |
| 5,044,444 A | * | 9/1991 | Coronado | 166/387 |
| 5,782,303 A | * | 7/1998 | Christian | 166/311 |

* cited by examiner

Primary Examiner—Hoang Dang
(74) Attorney, Agent, or Firm—Hovey Williams LLP

(57) ABSTRACT

An improved dump valve assembly (22) is provided for use as a part of an elongated, sectionalized, tubular downhole pipe string (18). The assembly (22) includes a tubular pipe section (24) having endmost threading (34, 38) and a rupture disc fitting (26); the fitting (26) includes a metallic, preferably concavo-convex disc (50) with preformed lines of weakness (52, 54) on one face thereof. The section (24) is interconnected between a pair of lower pipe sections (20a, 20b). In operation when it is desired to elevate the string (18) from the well, the fluid within the string (18) is pressurized sufficiently to rupture the disc (50), thereby allowing fluid within the string (18) to drain. The string (18) and other well components can then be removed from the well without contamination owing to spillage from the tubular string (18).

15 Claims, 2 Drawing Sheets

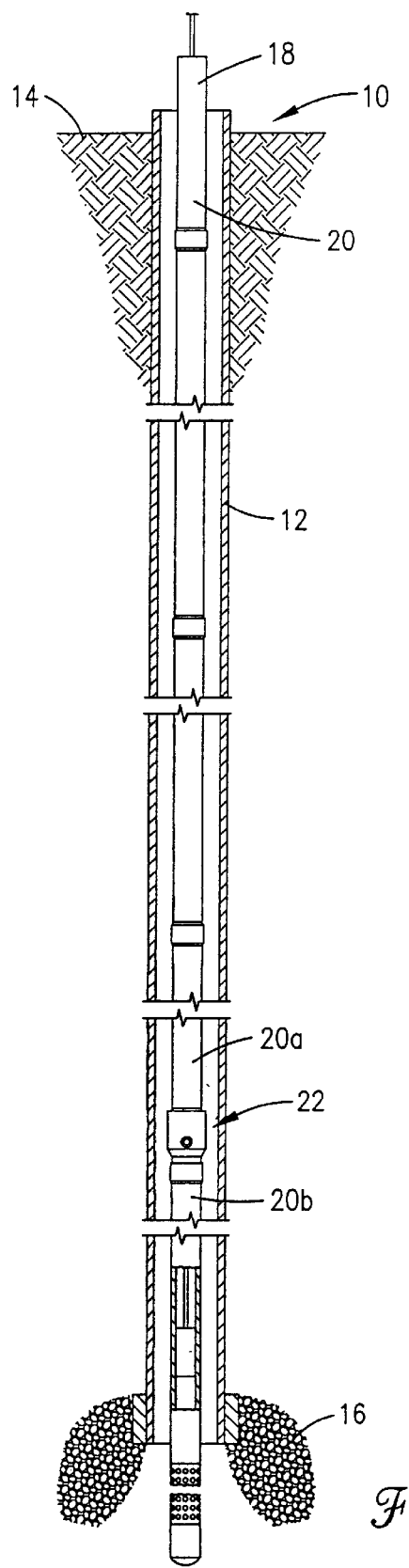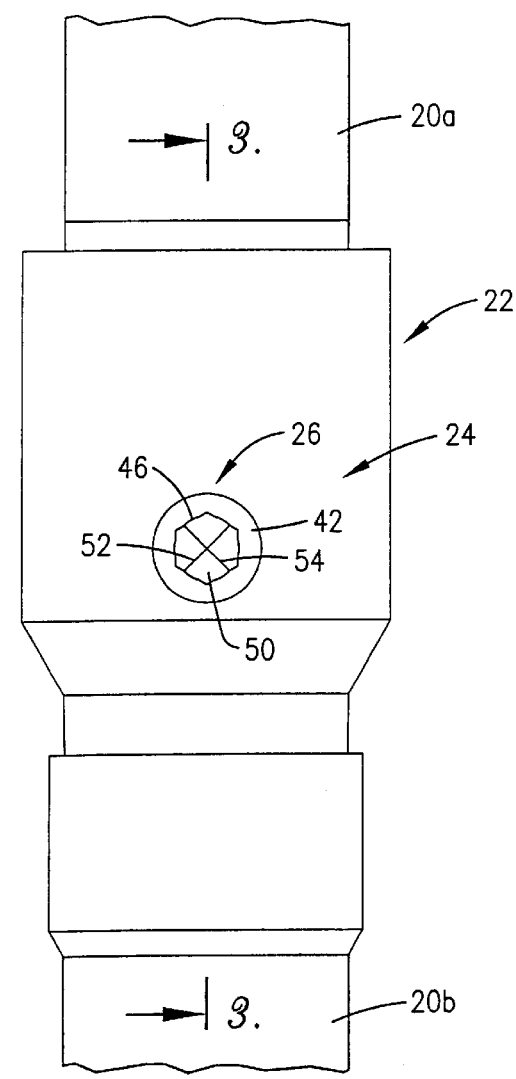
Fig. 1.
Fig. 2.

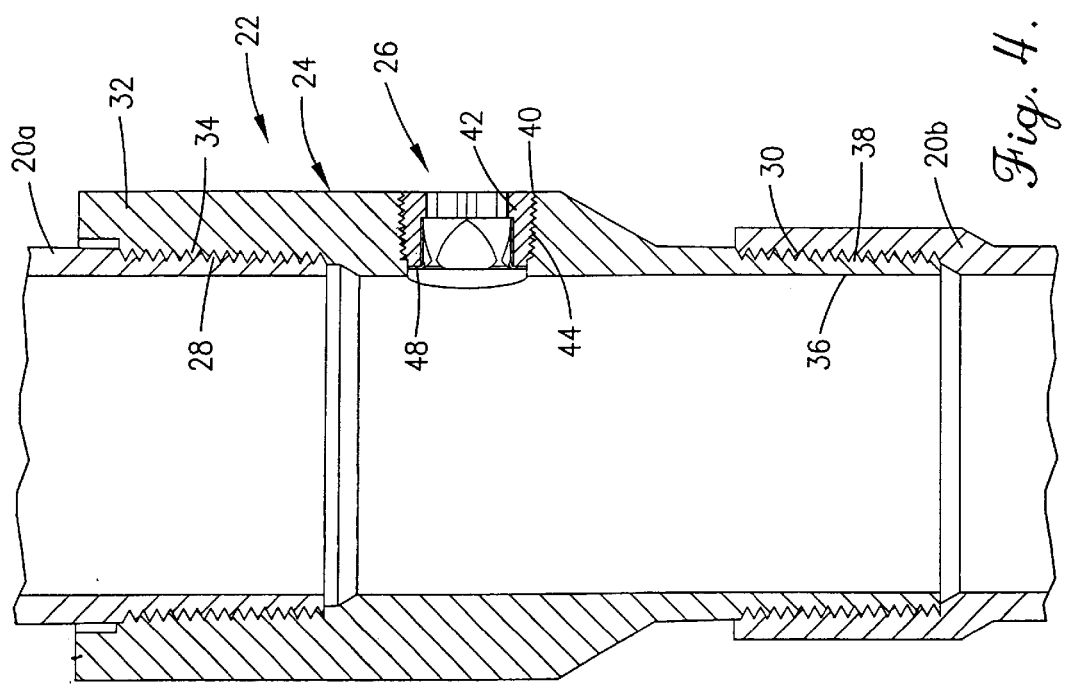
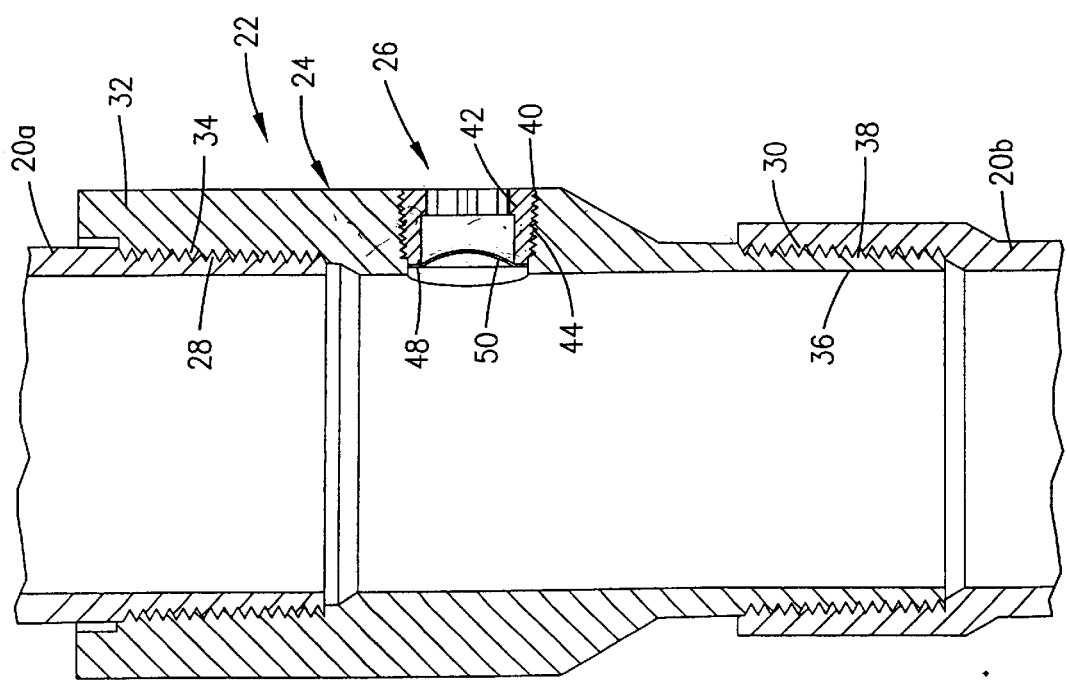

ically, the invention is concerned with such a dump
DUMP VALVE ASSEMBLY FOR SELECTIVE DRAINING OF LIQUID FROM AN OIL WELL PIPE STREAM

RELATED APPLICATION

This application is a continuation of U.S. application Ser. No. 09/078,891, filed May 14, 1998, entitled DOWNHOLE DUMP VALVE, now abandoned, and U.S. application Ser. No. 09/863,993, filed May 23, 2001, entitled DOWNHOLE DUMP VALVE, now U.S. Pat. No. 6,591,915.

BACKGROUND OF THE INVENTION

1. Field of the Invention

The present invention is broadly concerned with a reliable dump valve assembly to be used as a part of a downhole pipe string employed in oil wells or the like, and to an improved method for selective draining of pumping fluid from the pipe string prior to elevation thereof to the surface, thereby eliminating or minimizing environmental contamination caused by fluid drainage from the pipe string. More particularly, the invention is concerned with such a dump valve assembly and method, which preferably makes use of a metallic, frangible, concavo-convex rupture disc configured for reliably bursting at a predetermined internal fluid pressure. and an improved method of operator control, selective full drainage of pumping fluid.

2. Description of the Prior Art

Conventional oil or gas wells include an annular, cementitious elongated casing extending from grade down to the recoverable oil supply. An elongated, tubular, multiple-section pipe string is positioned within the casing and in turn houses and/or is attached to an artificial lift system.

It is necessary from time to time to extract the artificial lift system or their components for servicing thereof. This involves elevating the pipe string and/or sucker rod assembly, and detaching these parts section by section. However, owing to the fact that the pipe string is filled with pumping fluid, it sometimes occurs that this fluid is simply drained at grade during the dismantling process; this is objectionable because of the environmental pollution it causes.

It has been known in the past to provide dump valve units associated with downhole pipe strings which can be remotely actuated so as to drain the pipe string prior to and during the extraction process. For example, U.S. Pat. No. 4,286,662 describes a tubing drain fitted into the sidewall of a short pipe section coupler which has a blowout piston retained in place by a shear pin. A similar device has been commercialized under the designation "Series 500 Tubing Drain" by Quinn's Oilfield Supply Ltd. of Red Deer, Alberta.

SUMMARY OF THE INVENTION

The present invention provides an improved dump valve assembly adapted for interconnection between a pair of elongated downhole pipe sections forming a part of a downhole pipe string, with the dump valve assembly permitting selective drainage of fluid from the string. The assembly of the invention is relatively inexpensive and affords reliable drainage of a pipe string through the simple expedient of pressurizing the column of pumping fluid within the string to a predetermined pressure (e.g., 2000 psi).

Broadly speaking the dump valve assembly of the invention is operable for interconnecting a pair of string pipe sections in an end-to-end relationship and includes an elongated, tubular pipe section connection body presenting opposed ends in a sidewall; the ends have structure for interconnecting the pair of pipe sections, whereas the sidewall has opposed inner and outer surfaces and is configured to present an opening therethrough. A fitting is located within the sidewall opening and includes a metallic, frangible, shape-retaining rupture disc oriented for normally preventing fluid flow through the sidewall opening. The rupture disc has at least one line of weakness formed therein for reliable rupture thereof upon pressurization of the fluid within the pipe string in order to permit drainage thereof. Preferably, the rupture disc is of concavo-convex configuration and is oriented with the concave face thereof proximal to the inner face of the connection body sidewall; the lines of weakness may be formed by grinding or other ablation processes, but preferably are formed by scoring.

The fitting is normally in the form of an annular metallic housing presenting inboard and outboard surfaces and is adapted for receipt within the sidewall opening, with the rupture disc being fixedly secured to the housing (preferably by permanent welding). The sidewall opening and outboard surface of the housing are complementally threaded for threaded mounting of the housing within the sidewall. Accordingly, it is a simple matter to replace the fitting after each use of the dump valve assembly. The housing also normally includes structure for retaining the disc upon rupture thereof, although in preferred forms the disc is provided with lines of weakness arranged so as to eliminate or minimize the possibility of disc fragmentation upon rupture thereof.

Preferred rupture discs in accordance with the invention includes a pair of intersecting, transverse score lines on the convex face thereof. The disc should normally have a thickness of from about 0.003–0.090 inches, and more preferably from about 0.010–0.040 inches. The score lines should have a depth of from about 0.001–0.060 inches. The disc should moreover be formed from a metal having appropriate characteristics to withstand several downhole conditions, such as stainless steel, nickel or Inconel.

BRIEF DESCRIPTION OF THE DRAWINGS

FIG. 1 is a schematic, fragmentary view in partial vertical section illustrating typical downhole well components including an outermost casing, an elongated, tubular, multiple section pipe string, a sucker rod assembly within the pipe string, and the dump valve assembly of the present invention interconnected between lower pipe sections of the string;

FIG. 2 is an enlarged, fragmentary view of the portion of the downhole pipe string occupied by the dump valve assembly of the invention;

FIG. 3 is a vertical section view taken along line 3—3 of FIG. 2 and illustrating in detail the configuration of the dump valve assembly, the latter shown with the rupture disc thereof in its fluid flow-blocking relationship; and FIG. 4 is a vertical sectional view similar to that of FIG. 3 but depicting the rupture disc in its ruptured condition.

DETAILED DESCRIPTION OF THE PREFERRED EMBODIMENT

Turning now to the drawings, and particularly FIG. 1, an oil well 10 is illustrated. The latter includes, within the well bore, a cementitious annular casing 12 leading from grade 14 to a lower recoverable supply 16 of petroleum product. An elongated, multiple-section, end-to-end interconnected tubular pipe string 18 is positioned within the casing 12 and includes individual, threadably interconnected pipe sections 20.

A dump valve assembly 22 is interconnected between a pair of lower pipe sections 20a and 20b as shown. The assembly 22 includes an elongated, tubular pipe section 24 supporting a rupture disc fitting 26.

Referring to FIGS. 3 and 4, it will be observed that the lower end of pipe section 20a has external pipe threads 28, whereas the upper end of complemental section 20b has internal threads 30. As will be readily understood, these pipe sections 20a, 20b could be interconnected by threading the lower end of section 20a into the upper end of section 20b. However, the assembly 22 is interconnected between these pipe sections and for this purpose, the upper end 32 of the sidewall 24 has internal pipe threading 34 complemental with the threading 28; similarly, the lower end 36 of the sidewall 24 has external threading 38 complemental with threading 30 of pipe section 20b. It will thus readily be seen that the sidewall 22 forms a tubular interconnection between the pipe sections.

The sidewall 22 also has a threaded, lateral opening 40 therethrough intermediate ends 32 and 36. This opening 40 is designed to accept the metallic fitting 26. The latter has a circular housing body 42 having external threading 44 mating with the threading of opening 40. The outer end of housing body 42 is configured to present a hexagonal opening 46 presenting flats for insertion of a rotatable shank tool. The inboard annular face of the housing 42 is configured to receive and support the annular margin 48 of a metallic rupture disc 50. As shown, the disc 50 is of generally concavo-convex configuration and is oriented with the concave face thereof adjacent the inner surface of sidewall 24. Normally, the margin 48 is permanently welded to the inboard annular face of the housing 42. Referring to FIG. 2, it will be seen that the concave face of the disc 50 is provided with a pair of intersecting score lines 52, 54 which extend substantially the full extent of the bulged face thereof.

In one preferred embodiment, the housing 42 is formed of #304 stainless steel, whereas the rupture disc is fabricated from Inconel, a known nickel alloy, and has a thickness of about 0.010 inches. The score lines have a depth of about 0.005 inches.

It will be appreciated that during normal use of the assembly 22, the disc 50 remains in its intact, non-ruptured condition, and in no way detracts from the usual operation of the pipe string 20 or other well components. However, when it becomes necessary to withdraw the pipe string from the well casing, it is only necessary to pressurize the column of fluid within the pipe string 20 to a predetermined extent sufficient to rupture the disc 50. In the indicated embodiment, pressurization to a level of about 2000 psi is sufficient to rupture the disc. This orientation is illustrated in FIG. 4, where it will be seen that the disc ruptures along the score lines 52, 54 so as to create four circumferentially spaced "petals". It will be observed in this respect that the housing 42 is configured so as to retain these "petals" in the event that one or more breaks free from the disc.

It will thus be seen that the present invention provides a greatly improved and reliable downhole dump valve assembly which gives improved operational characteristics as compared with prior dump valves.

We claim:

1. An operator controlled, selectively actuatable downhole dump valve unit for selective draining of pumping liquid from a producing oil well downhole pipe string, said pipe string having an elongated, tubular pipe section connection body attached to a pipe section that is located in general proximity to and above a pump unit connected to the pipe string, said connection body having a sidewall with opposed inner and outer faces presenting a generally cylindrical interior having a selected internal diameter, said connection body being provided with a threaded opening extending through the sidewall between the inner and outer faces thereof, said dump valve unit comprising;

an integral, externally threaded pressure activated fitting adapted to be threaded into the threaded opening in the connection body in disposition extending between the inner and outer faces of the connection body to form a thread to thread, complemental, metal to metal, liquid tight seal between the fitting and the sidewall, said fitting having a tubular housing which has wall structure presenting a central liquid discharge passage therethrough, said wall structure having a circular inner edge portion defining the pumping liquid entrance of the passage that is adjacent the inner face of the connection body, said circular inner edge portion of the wall structure being of a diameter approximately equal to the diameter of said passage, said fitting being provided with a thin, metallic, frangible, shape-retaining rupture disc having an outer circular marginal portion welded to the inner circular edge of the wall structure defining said passage through the tubular fitting, the disc upon rupture presenting an opening therethrough having an effective diameter at least about as great as the diameter of the passage through the housing of the fitting, the diameter of said opening through the disc upon rupture thereof being at least about one-fourth times the internal diameter of the connection body, said disc being bulged inwardly of the passage to present opposed concavo-convex surfaces such that the concave surface thereof directly faces the interior of the connection body, said disc being provided with at least one line of weakness extending across the disc, said disc being of a thickness and having at least one line of weakness such that the disc thickness and line of weakness depth are correlated to impart a predetermined pumping liquid withstand pressure to the disc sufficient to withstand the pressure of pumping liquid normally contained in a particular length of pipe string when the pipe string is inserted in and extends along the length of the well casing, thereby preventing pumping liquid flow through the passage in the housing under normal production operating conditions, the disc thickness and the line of weakness depth being further correlated to reliably effect operator-actuated rupture of the disc when a predetermined disc activation pressure is applied to the pumping liquid in the pipe string to drain all of the pumping liquid from the pipe string through the opening in the disc and thence through the discharge passage of the fitting prior to removal of the pipe string from the well.

2. A downhole dump valve unit as claimed in claim 1 wherein said fitting is provided with shoulder structure extending into the passage for retaining the opened petals of a ruptured disc substantially within the passage in generally conforming relationship to the wall structure defining said passage.

3. A downhole dump valve unit as claimed in claim 1 wherein said design of a thickness within the range of about 0.003 in. to about 0.090 in. and the line of weakness is of a depth within the range of about 0.001 in. to about 0.060 in.

4. A dump valve assembly for operator controlled, selective full drainage of pumping liquid from a producing oil well downhole pipe string formed of end to end pipe sections and having a pump unit at the lower end thereof, which permits conventional pulling of the pipe string from the oil well as the pipe sections are successively disassembled without significant spillage of pumping liquid contained in the pipe string onto the area surrounding the oil well, said assembly comprising;

an elongated pipe section connection body having a sidewall and end structure for connection of the body to the lower part of the pipe string above the pump unit, said sidewall of the connection body having opposed inner and outer faces presenting a generally cylindrical internal diameter, said connection body being provided with an internally threaded opening therethrough between said faces; and an integral fitting having a tubular housing having an outer cylindrical wall surface and an inner tubular wall surface presenting a central pumping liquid discharge passage through the housing, said inner wall surface defining the passage having generally axially aligned, spaced pumping liquid entrance and pumping liquid exit edge portions respectively, a portion of the outer wall surface of the housing being provided with external threads for complementally engaging the threads of the threaded opening in the sidewall of the pipe section, the pumping liquid entrance edge portion of the fitting being of a diameter approximately equal to the diameter of said passage, said fitting being sealingly and removably threaded into the opening in the sidewall of the pipe section, said housing being provided with a thin, metallic, frangible, shape-retaining, passage-closing rupture disc having an outer circular marginal portion welded to the housing adjacent said entrance edge portion of the passage, the disc upon rupture presenting an opening therethrough having an effective diameter at least about as great as the diameter of the passage through the housing of the fitting, the diameter of said opening through the disc upon rupture thereof being at least about one-fourth times the internal diameter of the connection body, said disc being bulged inwardly of the passage to present opposed concavo-convex surfaces with the concave surface thereof facing the interior of the connection body in disposition directly exposed to pumping liquid in the connection body.

5. The dump valve assembly of claim 4, said housing including structure for assuring retention of disc petals within the passage of the housing upon rupture of the disc.

6. The dump valve assembly of claim 4, wherein the inner tubular wall surface of the housing is stepped to present a shoulder between the fluid entrance and fluid exit edge portions of the inner wall surface and extending around the circumference of the passage to assure retention of the disc petals within the passage of the housing upon rupture of the disc.

7. The dump valve assembly of claim 4, said housing having a generally hexagonal tool-receiving opening remote from said disc and coaxial with the passage for receipt of an insertion/removal tool.

8. The dump valve assembly of claim 4, wherein is provided a pair of said lines of weakness defining intersecting lines of weakness formed on the convex face of said rupture disc.

9. The dump valve assembly of claim 4, wherein at least one said line of weakness is a score line.

10. The method of claim 4, wherein said disc has a thickness of from about 0.003 in. to about 0.090 in.

11. The dump valve assembly of claim 4, said disc having a thickness from about 0.003 in. to about 0.090 in. and the line of weakness have a depth within the range of about (0.001 in. to about 0.060 in.

12. A dump valve assembly for operator controlled, selective full drainage of pumping liquid from a producing oil well downhole pipe string formed of end to end pipe sections and having a pump unit at the lower end thereof, which permits conventional pulling of the pipe string from the oil well as the pipe sections are successively disassembled without significant spillage of pumping liquid contained in the pipe string onto the area surrounding the oil well, said assembly comprising;

an elongated pipe section connection body having a sidewall and end structure for connection of the body to the lower part of the pipe string above the pump unit, said sidewall of the connection body having opposed inner and outer faces presenting a generally cylindrical internal diameter, said connection body being provided with an internally threaded opening therethrough between said faces; and an integral fitting having a tubular housing having an outer cylindrical wall surface and an inner tubular wall surface presenting a central pumping liquid discharge passage through the housing, said inner wall surface defining the passage having generally axially aligned, spaced pumping liquid entrance and pumping liquid exit edge portions respectively, a portion of the outer wall surface of the housing being provided with external threads for complementally engaging the threads of the threaded opening in the sidewall of the pipe section, the pumping liquid entrance edge portion of the fitting being of a diameter approximately equal to the diameter of said passage, said fitting being sealingly and removably threaded into the opening in the sidewall of the pipe section, said housing being provided with a thin, metallic, frangible, shape-retaining, passage-closing rupture disc having an outer circular marginal portion welded to the housing adjacent said entrance edge portion of the passage, the disc upon rupture presenting an opening therethrough having an effective diameter at least about as great as the diameter of the passage through the housing of the fitting, the diameter of said opening through the disc upon rupture thereof being at least about one-fourth times the internal diameter of the connection body, said disc being bulged inwardly of the passage to present opposed concavo-convex surfaces with the concave surface thereof facing the interior of the connection body in disposition directly exposed to pumping liquid in the connection body, said disc being of a thickness and having at least one line of weakness such that the disc thickness and line of weakness depth are correlated to impart a predetermined liquid withstand pressure to the disc sufficient to withstand the pressure of liquid normally contained in a particular length of pipe string when the pipe string is inserted in and extends along the length of the well casing, thereby preventing liquid flow through the passage in the housing under normal production operating conditions, the disc thickness and the line of weakness depth being further correlated to reliably effect operator-actuated rupture of the when a predetermined activation pressure is applied to the pumping liquid in the pipe string, said activation pressure being selectively applied to cause said rupture of the disc in order to drain all of said pumping liquid from the pipe string through the opening in the disc and the discharge passage of the fitting prior to removal of the pipe string from the well, the diameter of the disc and said line of weakness in the disc being of a pattern such that upon operator-selected rupture, the disc splits into individual petals that are in relatively close, generally conforming proximity to the inner wall surface of the passage.

13. The dump valve assembly of claim 12, said disc having a thickness from about 0.003 in. to about 0.090 in. and the line of weakness have a depth within the range of about 0.001 in. to about 0.060 in.

14. A downhole dump valve as claimed in claim 12 wherein said fitting is provided with shoulder structure extending into the passage for retaining the opened petals of a ruptured disc substantially within the passage in generally conforming relationship to the wall structure defining said passage.

15. A downhole dump valve as claimed in claim 12 wherein said disc is of a thickness within the range of about 0.003 in. to about 0.090 in. and the line of weakness is of a depth within the range of about 0.001 in. to about 0.060 in.

* * * * *

UNITED STATES PATENT AND TRADEMARK OFFICE
CERTIFICATE OF CORRECTION

PATENT NO. : 6,752,212 B2
DATED : June 22, 2004
INVENTOR(S) : Burris et al.

It is certified that error appears in the above-identified patent and that said Letters Patent is hereby corrected as shown below:

Title page,
Item [54], Title, should read -- DUMP VALVE ASSEMBLY FOR SELECTIVE DRAINING OF LIQUID FROM AN OIL WELL PIPE STRING --

Signed and Sealed this

Twenty-third Day of November, 2004

JON W. DUDAS
*Director of the United States Patent and Trademark Office*